United States Patent
Gao et al.

(10) Patent No.: US 10,929,065 B2
(45) Date of Patent: Feb. 23, 2021

(54) METHOD, DEVICE AND COMPUTER PROGRAM PRODUCT FOR COORDINATING ACCESS OPERATIONS

(71) Applicant: EMC IP Holding Company LLC, Hopkinton, MA (US)

(72) Inventors: Hongpo Gao, Beijing (CN); Jian Gao, Beijing (CN); Geng Han, Beijing (CN); Jianbin Kang, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 90 days.

(21) Appl. No.: 16/447,129

(22) Filed: Jun. 20, 2019

(65) Prior Publication Data
US 2020/0026469 A1    Jan. 23, 2020

(30) Foreign Application Priority Data
Jul. 20, 2018    (CN) .......................... 201810803262.X (51) Int. Cl.
*G06F 3/06*    (2006.01)

(52) U.S. Cl.
CPC .......... *G06F 3/0659* (2013.01); *G06F 3/0604* (2013.01); *G06F 3/0653* (2013.01); *G06F 3/0689* (2013.01)

(58) Field of Classification Search
CPC .... G06F 3/0659; G06F 3/0653; G06F 3/0689; G06F 3/0604; G06F 3/0634; G06F 3/061; G06F 3/0631
See application file for complete search history.

(56) References Cited

U.S. PATENT DOCUMENTS

| | | | | |
|---|---|---|---|---|
| 6,122,713 | A  * | 9/2000 | Huang | G06F 15/167 711/147 |
| 9,400,741 | B1 | 7/2016 | Bono et al. | |
| 9,779,023 | B1 | 10/2017 | Armangau et al. | |
| 9,916,102 | B1 | 3/2018 | Bassov et al. | |
| 9,933,945 | B1 | 4/2018 | Mao et al. | |

(Continued)

OTHER PUBLICATIONS

A. K. Sahai, "Performance aspects of RAID architectures," 1997 IEEE International Performance, Computing and Communications Conference, Phoenix, Tempe, AZ, USA, 1997, pp. 321-327, doi: 10.1109/PCCC.1997.581534. (Year: 1997).*

*Primary Examiner* — Khoa D Doan
(74) *Attorney, Agent, or Firm* — BainwoodHuang (57) ABSTRACT

Techniques coordinate access operations. Such techniques involve: obtaining first statistical data of a first set of access operations associated with a first storage resource pool in the RAID and second statistical data of a second set of access operations associated with a second storage resource pool in the RAID, the first set of access operations including a background access operation and a user access operation, and the second set of access operations including at least a user access operation; determining, based on the first and second statistical data, availability of a memory shared by the first and second storage resource pools; and adjusting, based on the availability, the background access operation in the first set of access operations to control a capacity of the memory occupied by the background access operation. Accordingly, the response time of the storage system for the user access operations can be shortened, etc.

18 Claims, 5 Drawing Sheets

(56) References Cited

U.S. PATENT DOCUMENTS

| | | |
|---|---|---|
| 10,013,425 B1 | 7/2018 | Bassov |
| 10,387,066 B1 | 8/2019 | Gonczi et al. |
| 10,409,776 B1 | 9/2019 | Bassov |
| 10,445,295 B1 | 10/2019 | Han et al. |
| 10,459,814 B2 | 10/2019 | Gao et al. |
| 10,496,491 B1 | 12/2019 | Suldhal |
| 10,521,398 B1 | 12/2019 | Forrester et al. |
| 10,592,165 B1 | 3/2020 | Han et al. |
| 10,592,469 B1 | 3/2020 | Bassov et al. |
| 10,733,051 B2 | 8/2020 | Dalmatov et al. |
| 2005/0234961 A1* | 10/2005 | Edvalson ............ H04L 67/1097 |
| 2010/0325268 A1* | 12/2010 | Muthiah ............... G06F 9/5027 |
| | | 709/224 |

* cited by examiner

METHOD, DEVICE AND COMPUTER PROGRAM PRODUCT FOR COORDINATING ACCESS OPERATIONS

CROSS-REFERENCE TO RELATED APPLICATION

This application claims priority to Chinese Patent Application No. CN201810803262.X, on file at the China National Intellectual Property Administration (CNIPA), having a filing date of Jul. 20, 2018, and having "METHOD, APPARATUS AND COMPUTER PROGRAM PRODUCT FOR COORDINATING ACCESS OPERATIONS" as a title, the contents and teachings of which are herein incorporated by reference in their entirety.

FIELD

Embodiments of the present disclosure generally relate to the field of data storage, and more specifically, to a method, device and computer program product for coordinating access operations.

BACKGROUND

With the development of data storage technology, various data storage devices have been able to provide users with enhanced data storage capability, and data access speed has also been increased significantly. Besides the enhanced data storage capability, the users also require better performance of the storage system, such as shorter response time.

Currently, a redundant array of independent disks (RAID) has been developed. In RAID, a storage disk is a logic concept and may include a plurality of extents. The plurality of extents included in a logic storage disk may be distributed on different physical storage devices. The physical storage devices are grouped based on their performance levels, forming a plurality of storage resource pools. All the storage resource pools share the same memory. Access operations for RAID include a user access operation and a background access operation. Generally speaking, the user access operation is expected to have a higher priority than the background access operation to improve user experience. Conventionally, when the load of user access operations is heavy, the background rebuilding operation in the same storage resource pool is throttled. However, this mechanism cannot check shared information between the storage resource pools. If the background access operations of some storage resource pools occupy capacity of the memory, the user access operations of other storage resource pools still need to wait in the queue.

SUMMARY

Embodiments of the present disclosure provide a method, device and computer program product for coordinating access operations.

In a first aspect of the present disclosure, there is provided a method for coordinating access operations for a RAID. The method includes: obtaining first statistical data of a first set of access operations associated with a first storage resource pool in the RAID and second statistical data of a second set of access operations associated with a second storage resource pool in the RAID, the first set of access operations including a background access operation and a user access operation, and the second set of access operations including at least a user access operation; determining, based on the first and second statistical data, availability of a memory shared by the first and second storage resource pools; and adjusting, based on the availability of the memory, the background access operation in the first set of access operations so as to control a capacity of the memory occupied by the background access operation.

In a second aspect of the present disclosure, there is provided a device for coordinating access operations for a RAID. The device includes at least one processing unit and at least one memory coupled to the at least one processing unit and storing instructions for execution by the at least one processing unit, the instructions, when executed by the at least one processing unit, causing the device to perform acts including: obtaining first statistical data of a first set of access operations associated with a first storage resource pool in the RAID and second statistical data of a second set of access operations associated with a second storage resource pool in the RAID, the first set of access operations including a background access operation and a user access operation, and the second set of access operations including at least a user access operation; determining, based on the first and second statistical data, availability of a memory shared by the first and second storage resource pools; and adjusting, based on the availability of the memory, the background access operation in the first set of access operations so as to control a capacity of the memory occupied by the background access operation.

In a third aspect of the present disclosure, there is provided a computer program product tangibly stored on a non-transient computer readable medium and including machine executable instructions which, when executed, cause a machine to perform any step of the method depicted according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In example embodiments of the present disclosure, the same reference symbols usually represent the same components.

Throughout the drawings, the same or corresponding reference symbols are used to indicate the same or corresponding parts.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in the following text in greater detail with reference to the drawings. Although preferred embodiments of present disclosure are displayed in the drawings, it is to be understood that the present disclosure can be implemented in various manners, not limited to the embodiments illustrated herein. On the contrary, these embodiments are provided to make the subject matter described herein more thorough and complete and convey the scope of the present disclosure completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one other embodiment." Terms "a first", "a second" and others can denote different or identical objects. The following text may also contain other explicit or implicit definitions.

Figure 1:
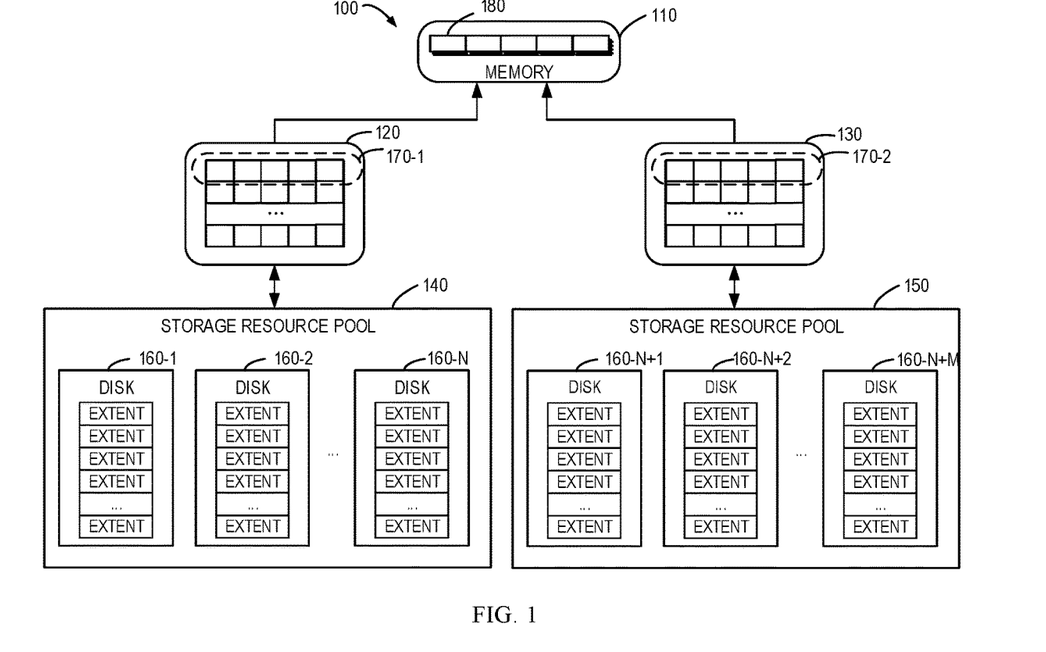
FIG. 1 is a schematic diagram illustrating an architecture of a storage system in accordance with embodiments of the present disclosure.

FIG. 1 is a schematic diagram illustrating an architecture of a storage system 100 in accordance with embodiments of the present disclosure. It is to be understood that the structure and function of the storage system 100 shown in FIG. 1 are only for the purpose of illustration, without suggesting any limitations to the scope of the present disclosure. Embodiments of the present disclosure may be embodied in different structures and/or functions.

In the context of the present disclosure, the storage system 100 may be based on RAID. The RAID-based storage system 100 may combine a plurality of storage disks into a storage disk array. By providing redundant storage devices, the reliability of the whole storage disk array can exceed a single storage device tremendously. RAID can provide various advantages over a single storage device, such as enhanced data integration, enhanced fault tolerance, increased throughput or capacity, and so on. It is to be understood that in the following discussion, the storage system may be discussed with RAID as an example, but this is illustrative rather than limiting. The storage system in accordance with embodiments of the present disclosure may also be implemented in other suitable forms.

As shown in FIG. 1, the storage system 100 has two storage resource pools 140 and 150, each of which includes a plurality of storage disks: 160-1, 160-2, . . . , 160-N, and 160-N+1, 160-N+2, . . . , 160-N+M (collectively referred to as "storage disk 160," where N, M are positive integers). A "storage disk" as used herein may refer to any non-volatile storage medium currently known or to be developed in the future, such as a magnetic disk, an optical disk, or a solid state disk (SSD). In the description herein, a disk will be taken as an example of a storage disk. However, it is to be understood that this is for ease of description, and is not intended to limit the scope of the present disclosure in any manner. It is also to be understood that although only two storage resource pools are shown in FIG. 1, there may be more storage resource pools, the number of which is by way of example only rather than limiting.

Each storage disk 160 may be divided into a plurality of extents, for example, each of which is of the size 10 GB. For example, at least some of the plurality of extents may be organized into disk arrays 120 and 130 which may be, for example, mapped RAID. The mapped RAID is an implementation of RAID, in which the disk arrays 120 and 130 are built based on extents of storage disk 160. Depending on the required level of redundancy and performance, the mapped RAID may be of different types, such as RAID 0, RAID 1, . . . , RAID 5, and the like.

The disk arrays 120 and 130 may include one or more groups of disk array, each of which may be comprised of multiple RAID stripes, such as RAID stripes 170-1, 170-2 (collectively referred to as "RAID stripe 170"). The RAID stripe may include a data section for storing user data and a parity section for storing parity information. Taking RAID 5 with a 4 D+1 P layout as an example, each stripe may include 4 data sections (that is, "4 D") and 1 parity section (that is, "1 P").

With RAID, the storage resource pools 140 and 150 may respond to requests for allocation and release of extents of the storage disk 160, and respond to events of state changes of the storage disk 160. For example, assuming that a storage disk fails, the storage resource pool in which the storage disk is located will receive a notification about the event of the storage disk and update the state of the extent of the storage disk accordingly.

The storage resource pools 140 and 150 share the same memory 110 which is formed by a plurality of memory units 180. The capacity of the memory 110 is allocated upon preset of the system. When an access operation for the storage system 100 requires memory capacity, the access operation requires capacity from the memory 110. When the capacity is used up, the access operation, including the background access operation and the user access operation, waits in the queue of access operations. Since the background access operation does not always exist, the preserved maximum capacity of the memory 110 should only meet the largest throughput of user access operations so as to not waste memory capacity.

Besides, the background access operation typically consumes more memory capacity than the user access operation. This is because for a request of the user access operation, the memory is only required to store parity data, with user data being stored in other memories outside the RAID memory. However, for background access requests, such as rebuilding or verifying operations, the memory needs to allocate capacity to store the data involved in the operations as well as the parity data.

Under the architecture shown in FIG. 1, conventionally the background access operation in the storage resource pool (for example, 140 and 150) in which the user access operation is also located will be throttled in order to control the response time to the user access operation to be short. However, since the storage resource pools 140 and 150 share the memory 110, the user access operation in the storage resource pool 150 must wait in the queue, for example when the background access operation in the storage resource pool 140 has an excessive speed and occupies too much capacity of the memory 110, until the background access operation in the storage resource pool 140 ends and capacity of the memory 110 is released. Therefore, since conventionally storage resource pools (for example, 140 and 150) do not share information, it cannot be known which other resource pool has caused the user access operation in a resource pool to be slow, and thus adjustments cannot be made accordingly.

Embodiments of the present disclosure propose a scheme for coordinating access operations for RAID in which the statistical data related to access operations is collected for each storage resource pool (for example, 140 and 150), respectively. According to the statistical data, conditions of user access operations and background access operations in a plurality of storage resource pools (such as 140 and 150) may be checked, and thus adjustments may be made accordingly. Such access operations may be performed by the storage system 100 when responding to host input/output (I/O) requests on behalf of one or more host computers. With this scheme, the global dynamic adjustment of background access operations may be performed with more flexibility and configurability. For example, when the load of user access operations is heavy, the background access operation is throttled so as to improve user experience. In the case of a smaller load of user access operations, the background access operation is accelerated to better maintain the system.

Figure 2:
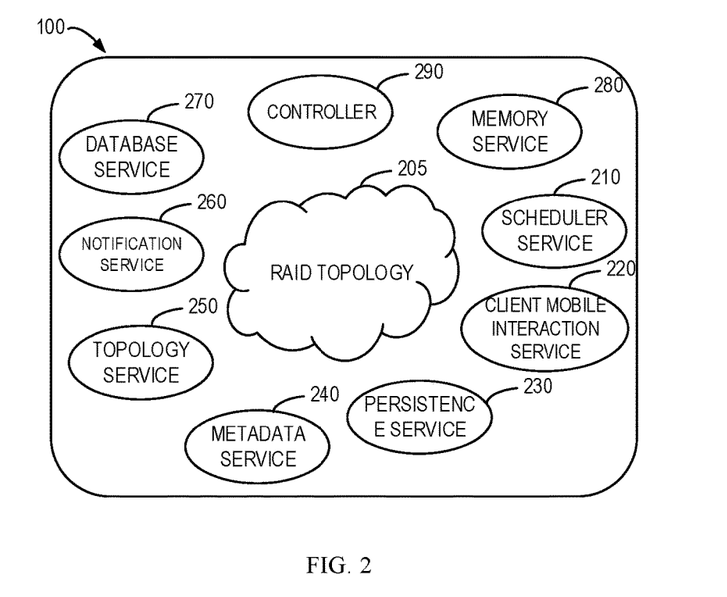
FIG. 2 is a schematic diagram illustrating a storage system including RAID and a plurality of service modules in accordance with embodiments of the present disclosure.

FIG. 2 is a schematic diagram illustrating the storage system 100 including RAID and a plurality of service modules in accordance with embodiments of the present disclosure. As illustrated, the storage system 100 includes an RAID topology 205 and multiple other service modules, such as a scheduler service module 210, a client mobile interaction service 220, a persistence service 220, a metadata service 240, a topology service 250, a notification service 260, a database service 270 and a memory service 280. To obtain statistical data from the storage resource pools 140 and 150, a controller 290 may be added to the storage system 100. The controller 290 may be outside the storage source pools 140 and 150 (e.g., a set of processors running specialized code to form specialized circuitry), both of which are registered in the controller 290. In some embodiments, the controller 290, for example, is a background service (BGS) controller, and evaluates how much the user access operation in the storage resource pools 140 and 150 is affected by the background access operation, and thus may send a control request to adjust the speed of the background operation of the storage resource pools 140 and 150.

Figure 3:
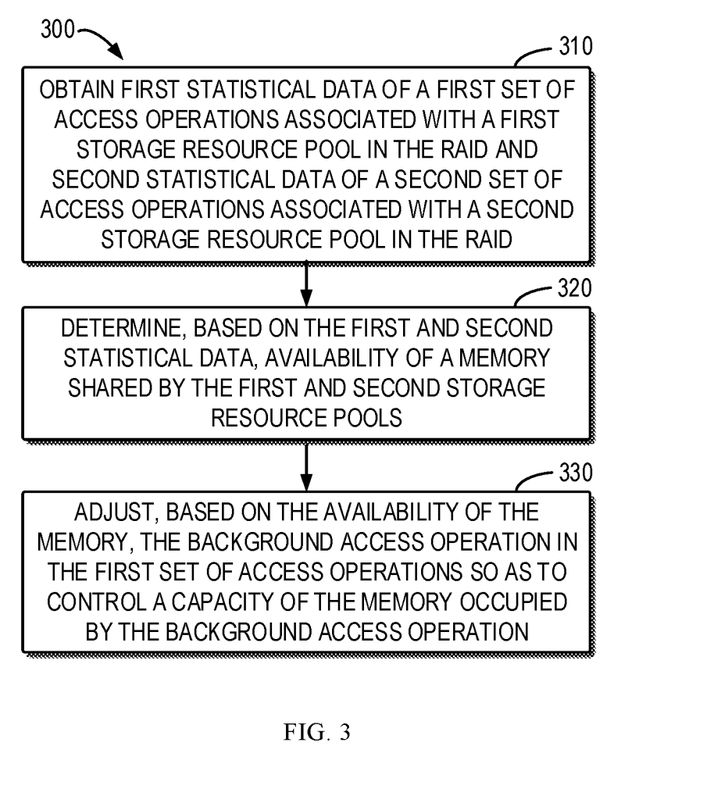
FIG. 3 is a flowchart illustrating an example of a method for coordinating access operations for RAID in accordance with embodiments of the present disclosure.

FIG. 3 is a flowchart illustrating an example of a method 300 for coordinating access operations for RAID in accordance with embodiments of the present disclosure. For example, the method 300 may be executed by the controller 290 shown in FIG. 2. The acts involved in the method 300 will be described below with reference to the storage system 100 shown in FIGS. 1 and 2. It is to be understood that the method 300 may further include additional acts not shown and/or omit the shown acts, and the scope of the present disclosure is not limited in this regard.

At block 310, the controller 290 obtains first statistical data of a first set of access operations associated with the storage resource pool 140 and second statistical data of a second set of access operations associated with the storage resource pool 150. The first set of access operations may include a background access operation and a user access operation, and the second set of access operations includes at least a user access operation. For example, it is possible that the second set of access operations only includes the user access operation. Alternatively, the second set of access operations may include both the user access operation and the background access operation. It is to be understood that the first and second sets of access operations may be used interchangeably, for example, the second set of access operations is associated with the storage resource pool 140 and the first set of access operations is associated with the storage resource pool 150.

The background access operation is generated when the storage resource pools 140 and 150 use background service for maintenance. The background service may repair or optimize the storage resource pool with background threads. Since each RAID stripe is composed of several extents, the background access operations may be executed concurrently in a plurality of threads to increase the speed. The I/O size of the background access operation is also configurable. The background access operation initiated by the background service may include rebuilding, verifying and replication.

For rebuilding, if either of the storage resource pools 140 and 150 fails, e.g., in five minutes, the storage resource pools 140 and 150 trigger a hot spare disk and rebuild the data on a new storage disk extent for the degraded RAID. For verifying, if RAID finds errors, it may make a verifying request and perform verification in the background service. For replication, if a storage disk 160 is set with an end of life (EOL) attribute, the storage resource pools 140 and 150 replicate data on a normal storage disk. Additionally, for expansion of the storage resource pools 140 and 150, after expansion, the storage disk extents are not distributed evenly across all the storage disks in the storage resource pool. Therefore, the background service will move data through replication.

The background access operations may have different priorities and are listed below with high to low priorities: rebuilding, verifying and replication. This order is based on severity of results. For example, if another storage disk fails before the rebuilding process is completed, there will be a risk of data loss. The longer the rebuilding process lasts, the greater the risk will be. Hence, rebuilding has the highest priority.

In some arrangements, obtaining, determining, and adjusting occur while processing circuitry of the storage system 100 performs access operations on the RAID in response to host I/O requests from a set of host computers.

Figure 4:
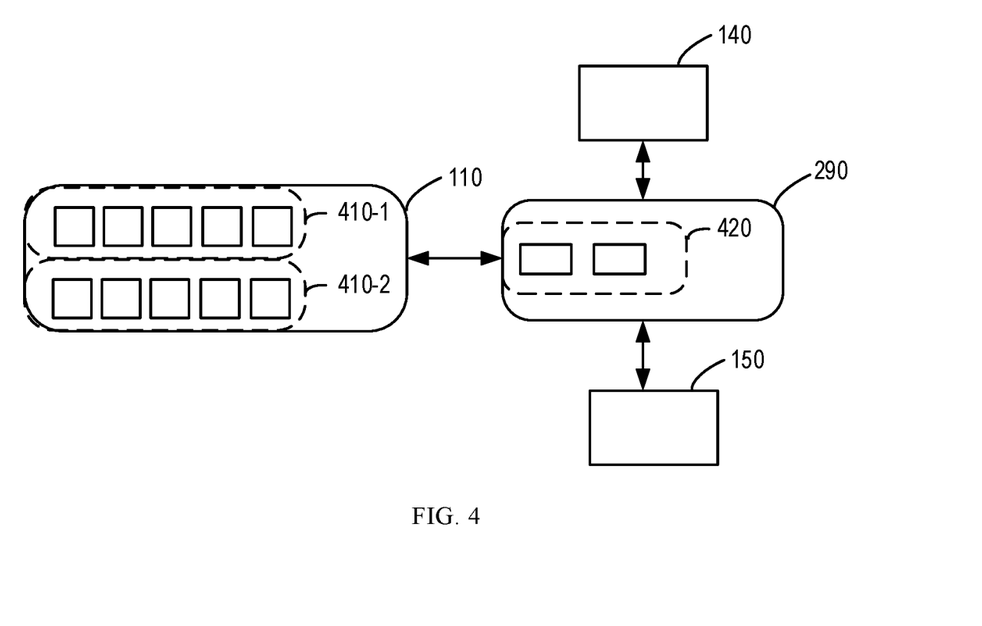
FIG. 4 is a schematic diagram for obtaining statistical data in accordance with embodiments of the present disclosure.

According to embodiments of the present disclosure, the statistical data may be obtained in various ways. FIG. 4 is a schematic diagram for obtaining statistical data in accordance with embodiments of the present disclosure. As shown in FIG. 4, the controller 290 may interact with the memory 110 and storage resource pools 140 and 150, respectively. As the interaction between the storage resource pool 140 or 150 and the memory 110 has been depicted with respect to FIG. 1, this interaction is not shown in FIG. 4 for the sake of conciseness. In combination with FIGS. 1 and 2, when the storage system 100 is enabled, the controller 290 may be enabled to gather statistical data of the access operations associated with the storage resource pools 140 and 150 in order to determine accordingly how to adjust the background operation in the storage resource pools 140 and 150. The controller 290 may maintain a storage resource pool list 420. When a new storage resource pool is created, the new storage resource pool may be registered in the controller 290 to be added to the storage resource pool list 420.

The controller 290 may allocate to the storage resource pools 140 and 150 memory buffers 410-1 and 410-2 from the memory 110 for storing statistical data, respectively, and transmit addresses of the buffers 410-1 and 410-2 to the storage resource pools 140 and 150. Upon receiving a request of the access operation, the storage resource pool 140 or 150 records and updates statistical data accordingly. For updating, only a part of the statistical data is updated without having to update all the statistical data every time.

In some embodiments, for the storage resource pools 140 and 150, a predefined data structure may be used to record the first and second statistical data. An example of the data structure is shown in Table 1, for example. It is to be understood that the example is only for illustration and other data structures may be utilized to record statistical data. The first and second statistical data may have the same form or different forms.

TABLE 1

```
typedef fbe_extent_pool_io_statistics_s {
    fbe_u32_t user_outstanding_io_count;
    fbe_u32_t user_average_response_time;
    fbe_u32_t user_min_response_time;
    fbe_u32_t user_max_response_time;
    fbe_time_t last_io_timestamp;
    /* for the operation type: invalid/rebuilding/verifying/replication*/
    fbe_extent_pool_bg_op_type_t bg_op_type;
    fbe_u32_t bg_parallel_count;
    fbe_u32_t bg_chunk_count;
    fbe_u32_t bg_reschedule_frequency;
    fbe_u32_t bg_reschedule_time;
} fbe_extent_pool_io_statistics_t;
```

In Table 1, user_outstanding_io_count represents the number of user I/Os within a certain time window;

user_average_response_time represents average response time of all the user I/Os within this time window;

use_min_response_time represents the minimum response time of all the user I/Os within this time window;

user_max_response_time represents the maximum response time of all the user I/Os within this time window;

last_io_timestamp represents a timestamp of a last user I/O. The controller 290 clears user statistical data in the corresponding resource pool (for example, 140 or 150), for example, when the gap between the timestamp and the current time exceeds a threshold, and releases resources of the memory 110 occupied by the statistical data, and prevents the statistical data from affecting the evaluation by the controller 290 of the condition of the current user access operation.

The statistical data for the user access operation defined above can reflect the condition of the current user access operation effectively, for example, how fast a response can be obtained, and so on.

Figure 5:
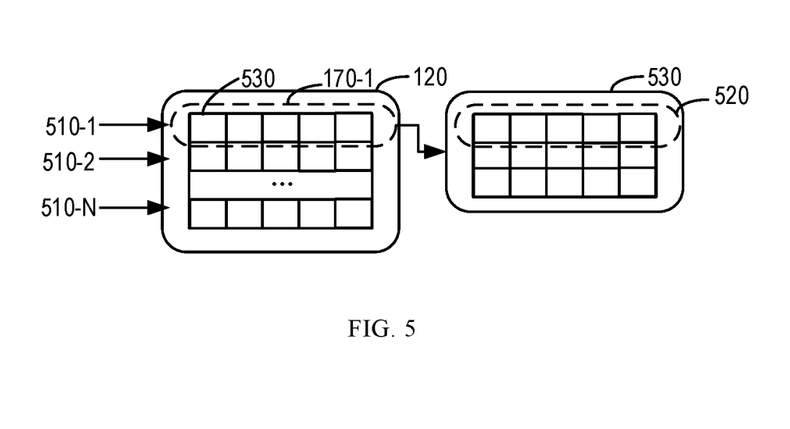
FIG. 5 is a schematic diagram illustrating multi-thread concurrency and granularity during a rebuilding process in accordance with embodiments of the present disclosure.

The statistical data for the background access operation in Table 1 will be further depicted with reference to FIG. 5. FIG. 5 is a schematic diagram of multi-thread concurrency and granularity during a rebuilding process in accordance with embodiments of the present disclosure.

In Table 1, bg_op_type represents the type of the current background access operation, including rebuilding, verifying and replication. If its value is invalid, it means that there are no background access operations at the moment.

bg_parallel_count represents the number of concurrent threads of the background access operation, also referred to as a background I/O concurrency degree. A plurality of threads may exist to perform rebuilding/verifying/replication operations simultaneously so as to obtain better performance. In FIG. 5, the disk array 120 includes a plurality of RAID stripes 170, such as 170-1. Stripes 170 include several extents 530. Therefore, rebuilding may be performed in a plurality of threads 510-1, 510-2, . . . , 510-N (N is a positive integer, collectively referred to as thread 510) concurrently.

bg_chunk_count represents the I/O size of each background access operation for each thread 510, also referred to as I/O granularity. I/O granularity is generally a power with base 2, of which the default value is 4 MB, and the range may be from 1 MB to 16 MB. For example, in FIG. 5, the size of the extent 530 may be, for example, 10 GB. A portion 520 in the extent 530 represents one portion rebuilt during a rebuilding operation and its size is, namely, the I/O granularity.

bg_reschedule_frequency denotes the frequency for scheduling the background access operation. As the background operation is performed in cycle, the scheduling frequency represents the interval between one cycle and another. For example, for an RAID stripe, every time 100 rebuilding operations are executed, the next rebuilding cycle will start after 200 ms. bg_reschedule_time indicates the duration of the background access operation, that is, the duration of the above cycle.

The statistical data of the background access operation defined above can reflect the condition of the current background access operation effectively and provide a basis for the subsequent adjustment.

Continuing to refer to FIG. 3, at block 320, the controller 290 determines based on the first and second statistical data, availability of the memory 110 shared by the storage resource pools 140 and 150. The controller 290 may have a background thread for checking the statistical data of the storage resource pools 140 and 150 and it can determine the availability of the memory 110 based on the number of user access operations. Additionally, the controller 290 may determine the availability of the memory 110 based on the response time of the user access operation. It is to be understood that the manner described above is only for purpose of illustration rather than for limitation, and other alternatives for determining availability may exist.

In some embodiments, the controller 290 checks the number of user access operations user_outstanding_io_count in the first and second statistical data at an interval (for example, 1 second), and calculates the capacity of the memory 110 to be consumed by the user access operation based on the number of current user access operations, the remaining capacity of the memory 110 being the available capacity. The availability of the memory 110 may be measured by a capacity ratio between the available capacity and the total capacity of the memory. When the capacity ratio is below the first capacity threshold, for example, the first capacity threshold is 20%, the availability of the memory 110 is determined to be low. When the capacity ratio exceeds a second capacity threshold, for example, the second capacity threshold is 50% (the second capacity threshold is greater than the first capacity threshold), the availability of memory 110 is determined to be high. In this way, the availability of memory 110 may be assessed accurately.

In some embodiments, the controller 290 checks any of user_average_response_time, user_min_response_time and user_min_response_time in the first statistical data at an interval (such as 1 second), hereinafter collectively referred to as response time. For the storage resource pools 140 and 150, standard response time can be predefined based on their response time to user I/Os. It is to be understood that as different storage resource pools (such as 140 and 150) have different performances, the standard response time may vary greatly. The availability of the memory 110 may be measured based on the detected response time and standard response time. When the detected response time is more than the first reference response time (for example, twice the standard response time), the availability of the memory 110 is determined to be lower. When the detected response time is less than the second reference response time (for example, standard response time, the second reference response time is less than the first reference response time), the availability of memory 110 is determined to be higher. In this way, the availability of memory 110 may be evaluated more intuitively.

In some embodiments, the availability of the memory 110 may be determined in the following manner. The controller 290 first detects the number of user access operations and then detects the response time of user access operations. This is because the response time of user access operations may be affected by other factors. Thus, the number of user access operations can reflect the availability of memory 110 more accurately than the response time.

At block 330, the controller 290 adjusts, based on the availability of the memory 110, the background access operation in the first set of access operations so as to control a capacity of the memory 110 occupied by the background access operation. In some embodiments, the controller 290 may invoke the interfaces provided by the storage resource pools 140 and 150 to adjust parameters of the background access operation in the corresponding resource pool. These parameters may be statistical data for the background operation, such as the number of parallel threads, granularity, scheduling frequency and duration.

In some embodiments, if the controller 290 determines that the capacity ratio exceeds a second capacity threshold, for example, the second capacity threshold is 50%, then the availability of the memory 110 is determined to be higher, and the background access operation may be accelerated by increasing granularity of the background access operation. Additionally or alternatively, the controller 290 may accelerate the background access operation by increasing the scheduling frequency of the background access operation. Additionally or alternatively, the controller 290 may accelerate the background access operation by increasing the number of parallel threads of the background access operation. Additionally or alternatively, the controller 290 may accelerate the background access operation by increasing the duration of the background access operation.

If the controller 290 determines that the capacity ratio is below the first capacity threshold, for example, the first capacity threshold is 20%, then the availability of the memory 110 is determined to be low, and the background access operation may be throttled by decreasing the granularity of the background access operation. Additionally or alternatively, the controller 290 may throttle the background access operation by decreasing the scheduling frequency of the background access operation. Additionally or alternatively, the controller 290 may throttle the background access operation by reducing the number of parallel threads of the background access operation. Additionally or alternatively, the controller 290 may throttle the background access operation by shortening the duration of the background access operation.

In some embodiments, if the controller 290 determines that the detected response time is less than the second reference response time (for example, standard response time), then the availability of memory 110 is determined to be high, and the background access operation may be accelerated in the manner described above. If the controller 290 determines that the detected response time is more than the first reference response time (for example, twice the standard response time), then the availability of memory 110 is determined to be low, and the background access operation may be throttled in the manner described above. It is to be understood that as the storage resource pools 140 and 150 have different standard response time, the comparison of response time is only implemented in the same storage resource pool, and the corresponding adjustment is also only performed in the same storage resource pool.

As can be seen from the above description, the solution for coordinating access operations for RAID according to embodiments of the present disclosure can adjust the background access operation dynamically and globally across a plurality of storage resource pools so that the user access operations for RAID have shorter response time, thereby improving user experience. In addition, with this solution, the background access operation may be accelerated when the load of the user access operation is light so as to optimize the overall performance of the storage system.

Figure 6:
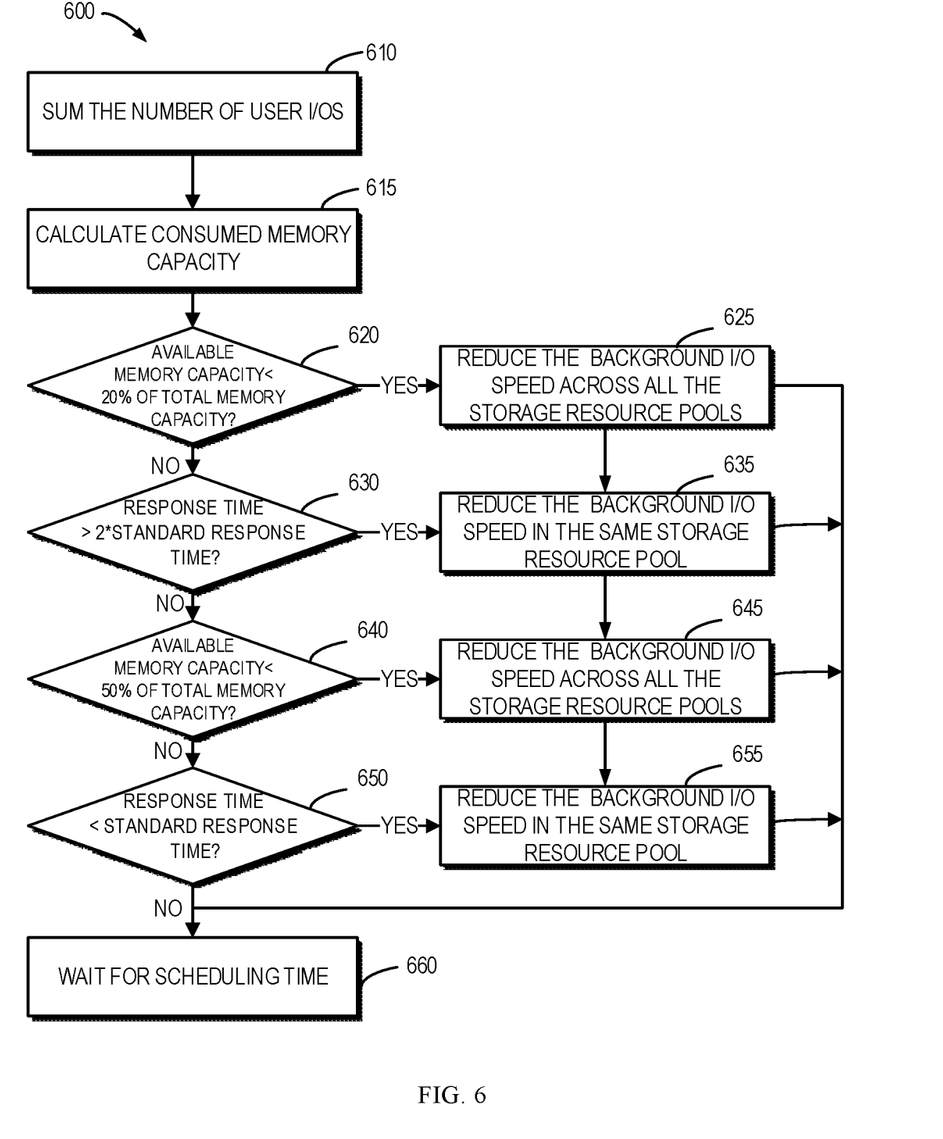
FIG. 6 is a flowchart illustrating an example method for coordinating background access operations in accordance with embodiments of the present disclosure.

FIG. 6 is a flowchart illustrating an example method 600 for adjusting the background access operations in accordance with embodiments of the present disclosure. The method 600 may be a specific example implementation of blocks 320 and 330 of the method 300. For example, the method 600 may be implemented by the controller 290 shown in FIG. 2. It is to be understood that the method 600 may further include additional acts not shown and/or omit the shown acts, and the scope of the present disclosure is not limited in this regard.

At block 610, the controller 290 sums the number of user I/Os based on the first statistical data and the second statistical data. Then, at block 615, the capacity of the memory 110 to be consumed by user I/Os is calculated.

At block 620, if the controller 290 detects that the available memory capacity is lower than 20% of the total memory capacity, then at block 625, the speed of the background access operation in storage resource pools 140 and 150 is reduced, otherwise the method 600 proceeds to block 630. At block 625, the specific steps are: the controller 290 finds the background access operation with the lowest priority in the storage resource pools 140 and 150 based on the first statistical data and the second statistical data and adjusts the background access operation by implementing the following, for example, decreasing granularity, decreasing a scheduling frequency, reducing the number of parallel threads and shortening duration.

During the adjustment, the background access operation does not stop complete. Rather, the parameters are only adjusted gradually to the lowest value. For example, the lowest granularity is set to 1 MB and the smallest number of threads is set to 1. The way of adjustment may be, for example, reducing the granularity by a decrement to 1 MB and then continuing to adjust the scheduling frequency. If all the parameters have been adjusted to the smallest values for the background access operation with the lowest priority while the available memory capacity is still below 20% of the total memory capacity, then the background access operation with a higher priority is adjusted. Adjusting the background access operation based on priorities ensures that the access operation with a lower priority is throttled first, so that the storage resource pools 140 and 150 are kept at a healthier state, for example, with a lower risk of data loss.

At block 630, if the controller 290 detects that the response time is twice the standard response time, then at block 635, the speed of the background access operation in the storage resource pool 140 or 150 is reduced, otherwise the method 600 proceeds to block 640. At block 635, the controller 290 detects, for example, that the response time of the storage resource pool 140 is twice the standard response time of the storage resource pool 140, then the speed of the background access operation in the storage resource pool 140 is reduced. The manner of reducing the speed of the background access operation is the same as that described at block 625 and thus will not be repeated here.

At block 640, if the controller 290 detects that the available memory capacity exceeds 50% of the total memory capacity, then the background access operation in the storage resource pools 140 and 150 is accelerated at block 645, otherwise, the method 600 proceeds to block 650. At block 645, the specific step is: the controller 290 finds the background access operation with the highest priority in the storage resource pools 140 and 150 based on the first statistical data and the second statistical data, and adjusts the background access operation by implementing the following, such as increasing granularity, increasing scheduling frequency, increasing the number of parallel threads, and increasing duration.

During the adjustment, for the background access operation, the parameters may be adjusted to the maximum values gradually. The way of adjustment may be, for example, increasing the granularity by an increment to the maximum value of the granularity (such as 16 MB) and then continuing to adjust the scheduling frequency. If all the parameters for the background access operation with the highest priority have been adjusted to the maximum values while the available memory capacity still exceeds 50% of the total memory capacity, then the background access operation with one level lower priority is adjusted. Adjusting the background access operation based on priorities ensures that the access operation with a higher priority is accelerated first, so that the storage resource pools 140 and 150 are kept at a healthier state, for example, with a lower risk of data loss.

At block 650, if the controller 290 detects, for example, that the response time of the storage resource pool 140 is less than the standard response time of the storage resource pool 140, then at block 655, the background access operation in the storage resource pool 140 is accelerated, otherwise the method 600 proceeds to block 660. Same as at block 635, at block 655, the adjustment is implemented in the same storage resource pool. Besides, the way of accelerating the background access operation is the same as that described at block 645 and thus will not be repeated here.

At block 660, the method 600 waits for scheduling time. The method 600 keeps repeating at a time interval (for example, 1 second) in the controller 290. With the method 600, it is possible to avoid user access operations for one storage resource pool from waiting in a queue for background access operations of other storage resource pools to release resources.

Figure 7:
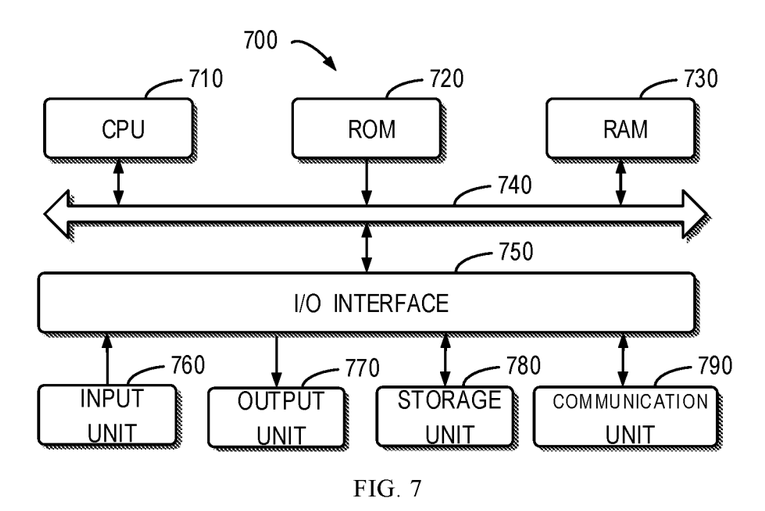
FIG. 7 is a schematic block diagram illustrating an example device that can be used to implement embodiments of the present disclosure.

FIG. 7 is a schematic block diagram of an example device 700 that can be used to implement embodiments of the present disclosure. As illustrated, the device 700 includes a central processing unit (CPU) 710 which can execute various appropriate actions and processing based on the computer program instructions stored in a read-only memory (ROM) 720 or the computer program instructions loaded into a random access memory (RAM) 730 from a storage unit 780. The RAM 730 also stores all kinds of programs and data required by operating the storage device 700. CPU 710, ROM 720 and RAM 730 are connected to each other via a bus 740 to which an input/output (I/O) interface 750 is also connected.

A plurality of components in the device 700 are connected to the I/O interface 750, including: an input unit 760, such as keyboard, mouse and the like; an output unit 770, such as various types of displays, loudspeakers and the like; a storage unit 780, such as magnetic disk, optical disk and the like; and a communication unit 790, such as network card, modem, wireless communication transceiver and the like. The communication unit 790 allows the device 700 to exchange information/data with other devices through computer networks such as Internet and/or various telecommunication networks.

Each procedure and processing as described above, such as the method 300 or 600, can be executed by the processing unit 710. For example, in some embodiments, the method 300 or 600 can be implemented as computer software programs, which are tangibly included in a machine-readable medium, such as the storage unit 780. In some embodiments, the computer program can be partially or completely loaded and/or installed to the device 700 via the ROM 720 and/or the communication unit 790. When the computer program is loaded to the RAM 730 and executed by the CPU 710, one or more steps of the above described method 300 or 600 are implemented.

The present disclosure may be a system, a device, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for coordinating access operations for a redundant array of independent disks (RAID), comprising:
    obtaining first statistical data of a first set of access operations associated with a first storage resource pool in the RAID and second statistical data of a second set of access operations associated with a second storage resource pool in the RAID, the first set of access operations including a background access operation and a user access operation, and the second set of access operations including at least a user access operation;
    determining, based on the first and second statistical data, availability of a memory shared by the first and second storage resource pools; and
    adjusting, based on the availability of the memory, the background access operation in the first set of access operations so as to control a capacity of the memory occupied by the background access operation.

2. The method according to claim 1, wherein obtaining the first statistical data includes the following: obtaining at least one of a type, granularity, a scheduling frequency, the number of parallel threads, and duration of the background access operation in the first set of access operations; and obtaining at least one of the number of user access operations, response time for the user access operation, and a timestamp of a last user access operation in the first set of access operations.

3. The method according to claim 1, wherein obtaining the second statistical data includes:
   obtaining at least one of the number of user access operations, response time for the user access operation, and a timestamp of a last user access operation in the second set of access operations.

4. The method according to claim 1, wherein determining the availability of the memory includes:
   determining an available capacity of the memory based on the number of user access operations in the first statistical data and the second statistical data; and
   determining a capacity ratio between the available capacity and a total capacity of the memory.

5. The method according to claim 4, wherein adjusting the background access operation includes:
   in response to the capacity ratio being below a first capacity threshold, performing at least one of the following:
   decreasing granularity of the background access operation,
   decreasing a scheduling frequency of the background access operation,
   reducing the number of parallel threads of the background access operation, and
   shortening duration of the background access operation; and
   in response to the capacity ratio exceeding a second capacity threshold that is greater than the first capacity threshold, performing at least one of the following:
   increasing the granularity of the background access operation,
   increasing the scheduling frequency of the background access operation,
   increasing the number of parallel threads of the background access operation, and
   increasing the duration of the background access operation.

6. The method according to claim 1, wherein determining the availability of the memory includes:
   determining, from the first statistical data, response time for the user access operation in the first set of access operations; and
   determining the availability of the memory based on the determined response time and first reference response time for the first storage resource pool.

7. The method according to claim 6, wherein adjusting the background access operation includes:
   in response to the determined response time being more than the first reference response time, performing at least one of the following:
   decreasing granularity of the background access operation,
   decreasing a scheduling frequency of the background access operation,
   reducing the number of parallel threads of the background access operation, and
   shortening duration of the background access operations; and
   in response to the determined response time being less than second reference response time for the first storage resource pool that is less than the first reference response time, performing at least one of the following:
   increasing the granularity of the background access operations,
   increasing the scheduling frequency of the background access operations,
   increasing the number of parallel threads of the background access operations, and
   increasing the duration of the background access operations.

8. The method according to claim 7, wherein adjusting the background access operation is performed based on a priority of the background access operation.

9. A device for coordinating access operations for a redundant array of independent disks (RAID), comprising:
   at least one processing unit;
   at least one memory coupled to the at least one processing unit and storing instructions for execution by the at least one processing unit, the instructions, when executed by the at least one processing unit, causing the device to perform acts including:
   obtaining first statistical data of a first set of access operations associated with a first storage resource pool in the RAID and second statistical data of a second set of access operations associated with a second storage resource pool in the RAID, the first set of access operations including a background access operation and a user access operation, and the second set of access operations including at least a user access operation;
   determining, based on the first and second statistical data, availability of a memory shared by the first and second storage resource pools; and
   adjusting, based on the availability of the memory, the background access operation in the first set of access operations so as to control a capacity of the memory occupied by the background access operation.

10. The device according to claim 9, wherein obtaining the first statistical data including the following: obtaining at least one of a type, granularity, a scheduling frequency, the number of parallel threads, and duration of the background access operation in the first set of access operations; and obtaining at least one of the number of user access operations, response time for the user access operation, and a timestamp of a last user access operation in the first set of access operations.

11. The device according to claim 9, wherein obtaining the second statistical data includes:
   obtaining at least one of the number of user access operations, response time for the user access operation, and a timestamp of a last user access operation in the second set of access operations.

12. The device according to claim 9, wherein determining the availability of the memory includes:
   determining an available capacity of the memory based on the number of user access operations in the first statistical data and the second statistical data; and
   determining a capacity ratio between the available capacity and a total capacity of the memory.

13. The device according to claim 12, wherein adjusting the background access operation includes:
   in response to the capacity ratio being below a first capacity threshold, performing at least one of the following:
   decreasing granularity of the background access operation,
   decreasing a scheduling frequency of the background access operation,
   reducing the number of parallel threads of the background access operation, and
   shortening duration of the background access operation; and in response to the capacity ratio exceeding a second capacity threshold that is greater than the first capacity threshold, performing at least one of the following:
increasing the granularity of the background access operation,
increasing the scheduling frequency of the background access operation,
increasing the number of parallel threads of the background access operation, and
increasing the duration of the background access operation.

14. The device according to claim 9, wherein determining the availability of the memory includes:
determining, from the first statistical data, response time for the user access operation in the first set of access operations; and
determining the availability of the memory based on the determined response time and first reference response time for the first storage resource pool.

15. The device according to claim 14, wherein adjusting the background access operation includes:
in response to the determined response time being more than the first reference response time, performing at least one of the following:
decreasing granularity of the background access operation,
decreasing a scheduling frequency of the background access operation,
reducing the number of parallel threads of the background access operation, and
shortening duration of the background access operations; and
in response to the determined response time being less than second reference response time for the first storage resource pool that is less than the first reference response time, performing at least one of the following:
increasing the granularity of the background access operations,
increasing the scheduling frequency of the background access operations,
increasing the number of parallel threads of the background access operations, and
increasing the duration of the background access operations.

16. The device according to claim 13, wherein adjusting the background access operation is performed based on a priority of the background access operation.

17. A computer program product having a non-transitory computer readable medium which stores a set of instructions to coordinate access operations for a redundant array of independent disks (RAID); the set of instructions, when carried out by computerized circuitry, causing the computerized circuitry to perform a method of:
obtaining first statistical data of a first set of access operations associated with a first storage resource pool in the RAID and second statistical data of a second set of access operations associated with a second storage resource pool in the RAID, the first set of access operations including a background access operation and a user access operation, and the second set of access operations including at least a user access operation;
determining, based on the first and second statistical data, availability of a memory shared by the first and second storage resource pools; and
adjusting, based on the availability of the memory, the background access operation in the first set of access operations so as to control a capacity of the memory occupied by the background access operation.

18. The computer program product according to claim 17, wherein obtaining, determining, and adjusting occur while processing circuitry performs access operations on the RAID in response to host input/output (I/O) requests from a set of host computers.

* * * * *